W. S. FOSTER.
CHAIN TIGHTENER.
APPLICATION FILED FEB. 24, 1916.
1,238,905.
Patented Sept. 4, 1917.
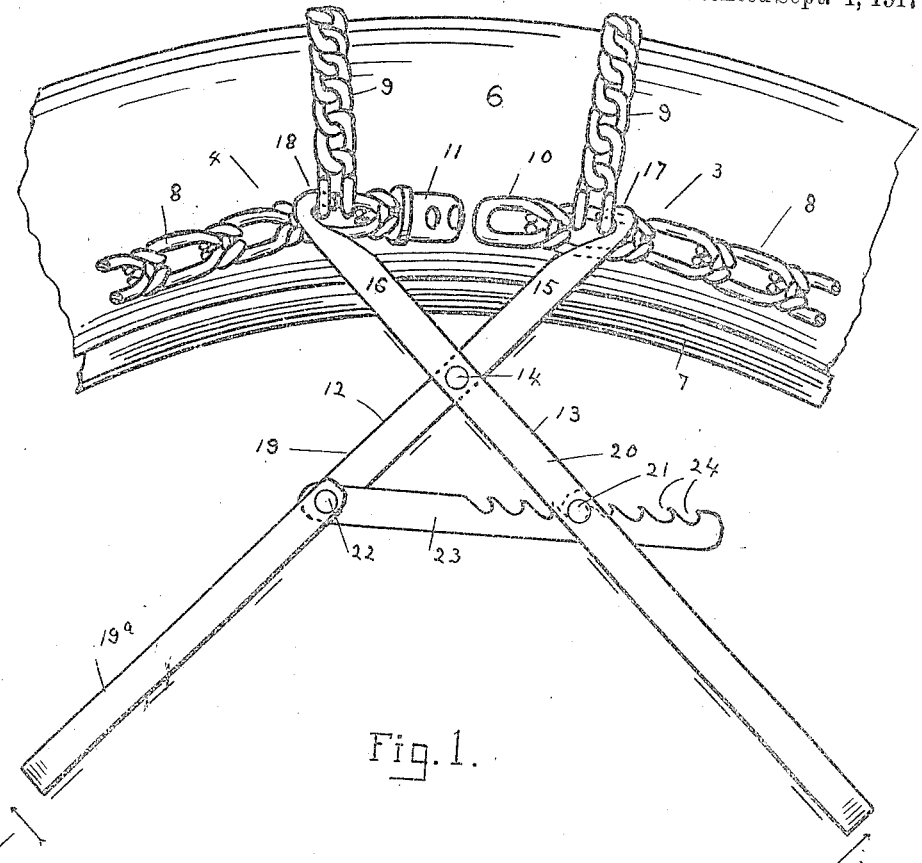
Fig. 1.
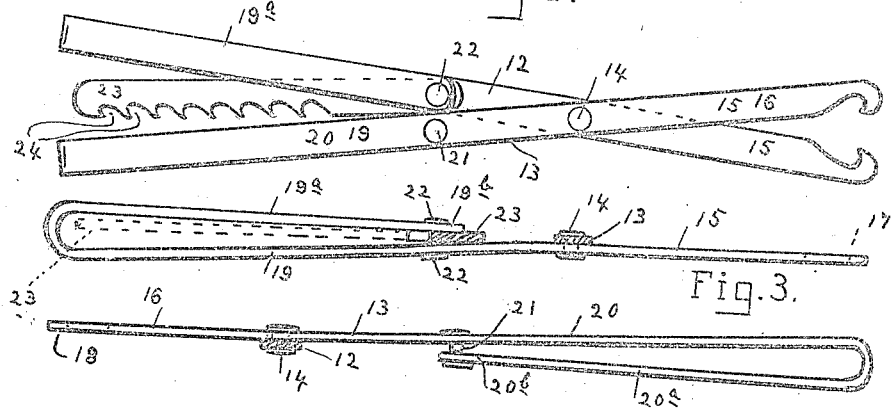
Fig. 2.
Fig. 3.
Fig. 4.
INVENTOR
William S. Foster
BY Martin & Jones
ATTORNEYS

UNITED STATES PATENT OFFICE.

WILLIAM S. FOSTER, OF UTICA, NEW YORK, ASSIGNOR TO FOSTER BROTHERS MANUFACTURING COMPANY, OF UTICA, NEW YORK, A CORPORATION.

CHAIN-TIGHTENER.

1,238,905.  Specification of Letters Patent.  Patented Sept. 4, 1917.

Application filed February 24, 1916. Serial No. 80,285.

*To all whom it may concern:*

Be it known that I, WILLIAM S. FOSTER, of Utica, in the county of Oneida and State of New York, have invented certain new and useful Improvements in Chain-Tighteners; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My present invention relates to chain tighteners or devices adapted to tighten up the chains commonly applied to automobile tires.

The purpose of my invention is to provide a chain tightener of improved and simple construction and one which is well adapted to do the work required.

A further purpose of my invention is to provide an article of the class described which is economical in construction, convenient and simple in operation and which will fold into very compact form.

A still further purpose of this invention is to provide a chain tightener wherein novel and efficient means are provided to hold the chain from slipping back.

Another object of my invention is to provide an article of the class described wherein a particularly efficient and convenient article is formed from relatively inexpensive material and with relatively inexpensive steps in the making of said tool. Another purpose is to provide a tool wherein the means for holding the chain from slipping back are peculiarly efficient and convenient so that the tool may be readily manipulated in the various positions in which it may be used.

Further purposes and advantages of my invention will appear from the specification herein and the claim hereinafter set forth.

Figure 1 shows a tool embodying my invention as applied to the chain of an automobile tire.

Fig. 2 shows a chain tightener in folded position.

Fig. 3 is an edge view of one of the levers of said device with the other parts shown as they would appear on line 3—3 of Fig. 1.

Fig. 4 is an edge view of the other member with the first member in cross section as on line 4—4 of Fig. 1 and with the locking member entirely withdrawn in order to more clearly show the construction of the handle arm of the second lever.

Referring to the drawings in a more particular description there will be seen a portion of a tire 6 and a rim 7 to which have been applied a chain of well-known form having portions 8 extending circumferentially about the tire and other portions 9 extending transversely of the tread of the tire and with end links or hooks 10 and 11 which are to be drawn together to hold the chain with sufficient tightness to hold the chain in place.

My chain tightener consists of a pair of two crossed levers 12 and 13 respectively pivotally connected to each other as by a rivet at 14 intermediate the ends of said levers and leaving relatively short and substantially equal arms 15 and 16 respectively one side of said pivot. These short arms are provided at their ends with hooks 17 and 18 facing toward each other and adapted to be readily inserted into the links of the chain.

Handle arms 19 and 20 of said levers 12 and 13 extend beyond the pivoting point for a sufficient distance to give the proper leverage for the work required. A convenient and the preferred material for making said levers is the common form of flat strips or band steel such as suggested in the drawings. My form of chain tightener is particularly adapted to be formed economically from this material and in fact is so designed as to produce an efficient and convenient tool out of said material with a few simple steps or operations.

The handle arms 19 and 20 after extending out from the pivoting point 14 the proper distance are bent back upon themselves in the form of an open loop with the portions 19$^a$ and 20$^a$ bent back in opposite directions so that their extremities 19$^b$ and 20$^b$ closely approach the arms 19 and 20 respectively about two-thirds of the way toward the pivoting point 14. The extremity 20$^b$ is rigidly connected in spaced relation to the handle arm 20 as by a pin or rivet 21 the shank of which bridges or closes the open end of the loop of this handle for the purpose hereafter mentioned. The extremity 19$^b$ is rigidly connected in spaced relation to the handle arm 19 as by pin or rivet 22.

Upon this pin 22 and between the extremity 19ᵇ and the arm 19 is pivotally mounted one end of a bar 23. When the tool is folded this bar 23 is housed more or less within the loop formed by the back-turned portion 19ᵃ and the opposite portion of the handle arm 19 as suggested in Fig. 2. It is apparent that this bar may be entirely housed within said loop but it is shown partly exposed in Fig. 2 in order to more clearly show the form of the free end of said bar. When the chain tightener is applied to a chain as shown in Fig. 1 the bar 23 is swung over toward the handle arm 20 of lever 13 with the bar entering the loop of that handle. The edge of said bar then toward the pin 21 and for some distance back from the free end of said rod is provided with a series of notches 24 extending back part way into the body of said bar and preferably slantingly arranged so as to open toward the pivoting point 14 as indicated in the drawings.

The tool having been applied to some of the links of the opposite ends of the chain which are to be brought together the operator presses the handle arms 19 and 20 of the tool together after the manner of pliers or tongs and uses the leverage thus obtained to draw the ends of the chain toward each other as far as necessary. When the ends of the chain have been thus brought together in proper position or whenever during the process of so joining the chain and it is desired to hold the chain from slipping back while the chain is being further arranged for the further tightening, the operator while still holding both of the handle arms of the tool may with either hand press the free end of locking bar 23 toward the pin 21 until one of the recesses 24 in said bar comes into engagement with said pin. On account of the slanting formation of the said notches, when the tool has been thus locked, the tension of the chain upon the tool will hold the locking bar against the pin 21 and thus the chain tightener is held from spreading out while the operator hooks or locks together the opposite ends of the chain or adjusts the chain for further tightening if necessary.

If further tightening is necessary the drawing together of the handles 19 and 20 forces the notched locking bar 23 slightly back from the pin 21 whereupon the operator may again press the locking bar forward as the distance to the next notch or several notches is gained. After the chain has been secured in desired position a temporary forcing together somewhat of the handle arms of the tool disengages the notched bar 23 from the pin 21 when said bar may be drawn back part way or entirely until housed within the loop of handle 19 and then by temporarily spreading the levers of the tool the hooks 17 and 18 may be disengaged from the links of the chain.

The purpose of bending the end 19ᵃ of handle arm 19 and the end 20ᵃ of handle arm 20 in opposite directions is to more conveniently balance the tool and provide for the proper even working arrangement of the locking bar as it works through the loop of handle arm 20 and engages pin 21. This purpose is further aided by a slight bend in opposite directions given to the two levers just back from their pivoting point as plainly shown in Figs. 2 and 3.

What I claim as new and desire to secure by Letters Patent is:

In a chain tightener the combination of two crossed levers pivotally connected to each other intermediate their ends and provided at the ends of their shorter arms with hooks facing toward each other, the outer ends of the handle arms of said levers being bent back upon themselves in an open loop with said ends spaced from the straight portion of said handle arms, a pin connecting each of said back-turned ends with the adjacent portion of its handle and a bar pivotally mounted at one end upon one of said pins and being adapted to swing bodily into and be housed within the loop of its handle when not in use and having its free end adapted to swing into the loop of the other handle and toward the pin of said handle and provided with notches on the edge toward said pin whereby said levers may be detachably locked in a plurality of positions, from being drawn apart.

In witness whereof I have affixed my signature, this 27th day of January 1916.

WILLIAM S. FOSTER.